D. N. PASCHAL.
COOKING UTENSIL.
APPLICATION FILED DEC. 29, 1916.

1,277,253.

Patented Aug. 27, 1918.
2 SHEETS—SHEET 1.

WITNESSES

INVENTOR
D. N. Paschal,
BY Victor J. Evans
ATTORNEY

D. N. PASCHAL.
COOKING UTENSIL.
APPLICATION FILED DEC. 29, 1916.
1,277,253.
Patented Aug. 27, 1918.
2 SHEETS—SHEET 2.
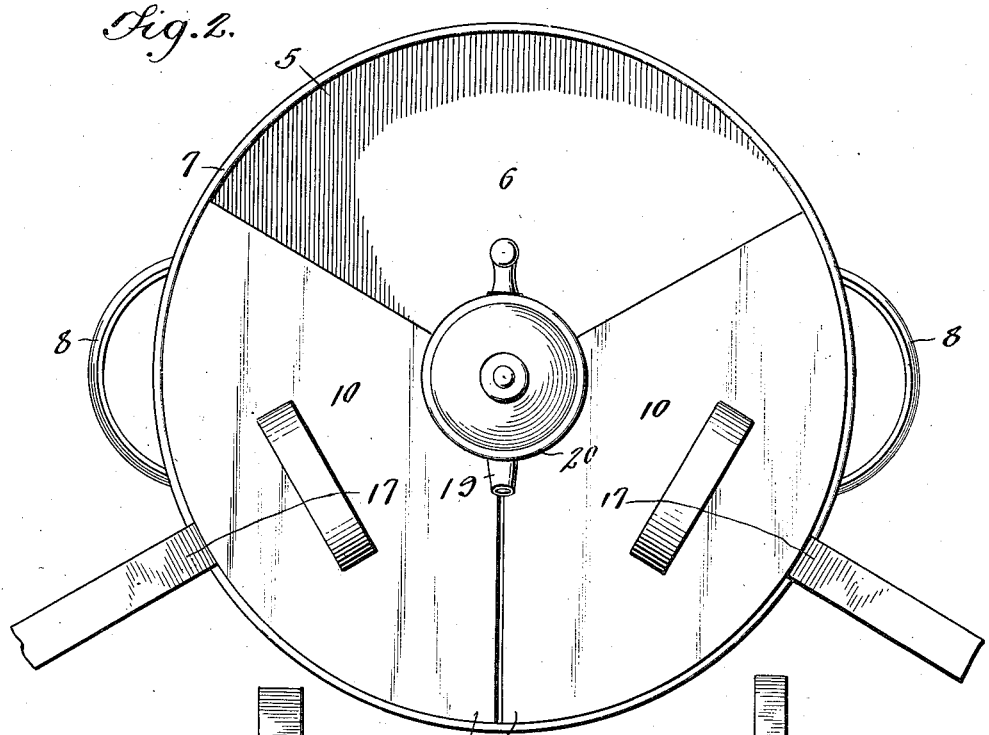
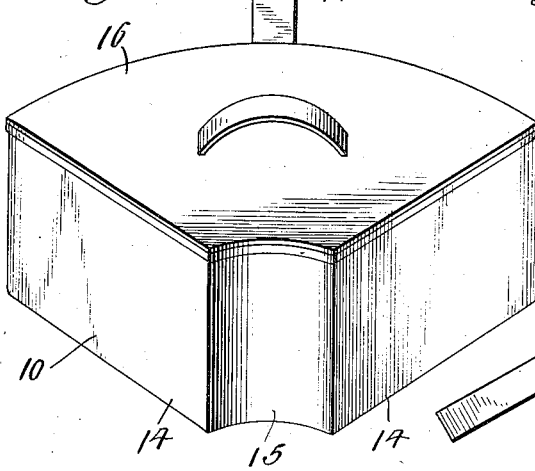
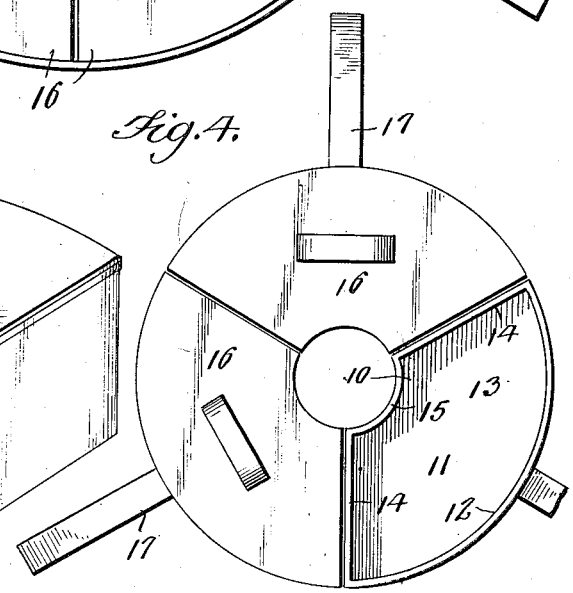
WITNESSES
INVENTOR
D. N. Paschal,
BY Victor J. Evans
ATTORNEY

UNITED STATES PATENT OFFICE.

DAVID NEWMAN PASCHAL, OF RICHMOND, VIRGINIA.

COOKING UTENSIL.

1,277,253.

Specification of Letters Patent.  Patented Aug. 27, 1918.

Application filed December 29, 1916. Serial No. 139,613.

*To all whom it may concern:*

Be it known that I, DAVID NEWMAN PASCHAL, a citizen of the United States, residing at Richmond, in the county of Henrico and State of Virginia, have invented new and useful Improvements in Cooking Utensils, of which the following is a specification.

This invention relates to cooking utensils such as are employed for boiling or stewing food products, and is designed to permit of different products being cooked at the same time with the aid of a single burner.

The invention, among other features, contemplates the provision of a pan of sufficient diameter to accommodate a series of individual receptacles being placed therein, certain of said receptacles being formed with concaved inner walls to accommodate the other receptacle fitting between the first mentioned receptacles.

A still further object of the invention is the provision of a plurality of individual sector-shaped receptacles, allowing the receptacles to snugly fit within the pan and to contact with one another.

With the above and other objects in view, the invention consists in the novel features, details of construction and combination of parts which will hereinafter be more fully set forth, illustrated in the accompanying drawing and pointed out in the appended claim.

Fig. 2 is a view similar to Fig. 1 with one of the individual sector-shaped food receptacles removed;

Fig. 3 is a perspective view of the sector-shaped food receptacle;

Fig. 4 is a plan view of the sector-shaped food receptacles removed from the pan and Fig. 5 is a transverse sectional view taken through the pan.

Figure 1:
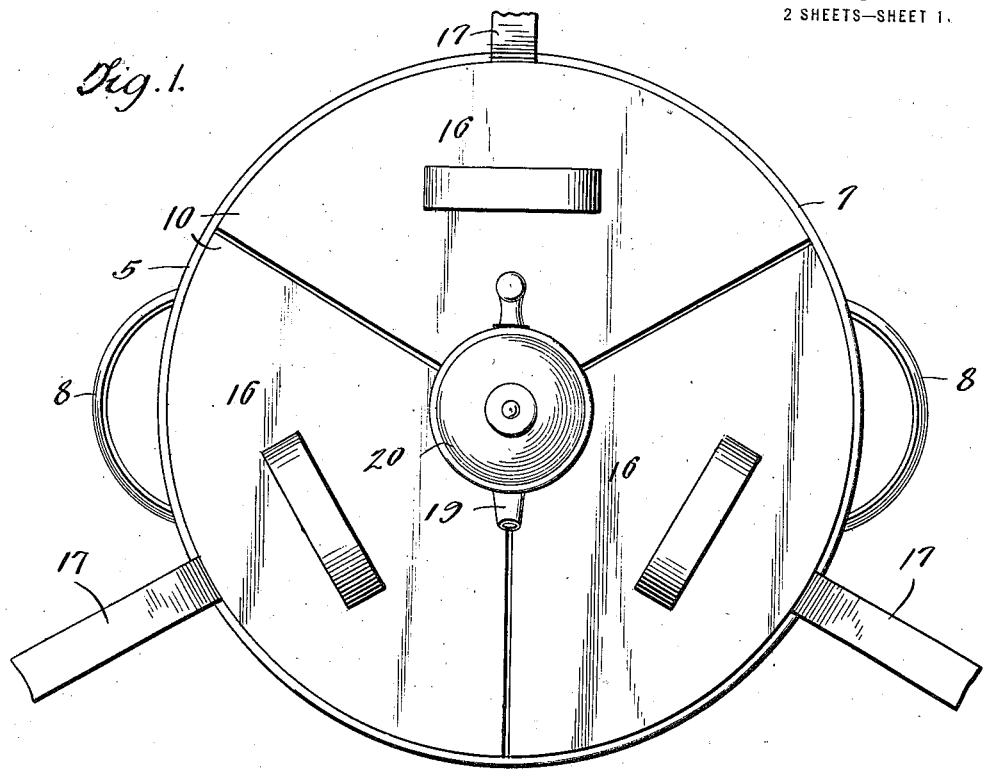
Figure 1 is a top plan view of the device in assembled form.
Figure 5:
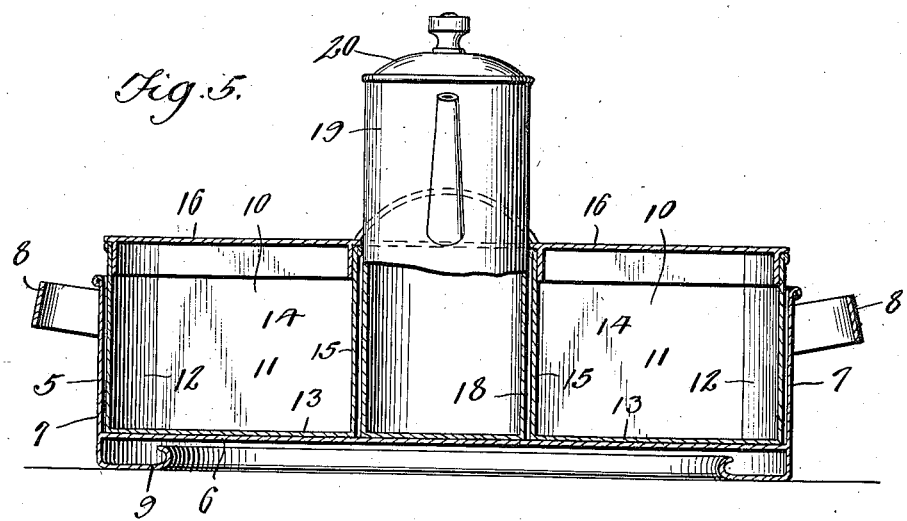

Referring more particularly to the accompanying drawings, in which like characters of reference refer to corresponding parts in the several views, 5 denotes a cylindric pan which may be constructed of any suitable material, preferably aluminum, and provided with a bottom wall 6 and an annular wall 7. Suitable handles 8 are connected to the annular wall of the pan for lifting or conveying the pan from place to place. The annular wall 7 of the pan extends below the plane of the bottom 6 thereof to provide at a point below and in spaced relation with the under surface of the bottom, an annular flange 9 adapted when the pan is supported over a flame to permit of a perfect distribution of the heat from the flame over the entire bottom of the receptacle.

The purpose of this pan 5, is to permit a plurality of sector-shaped individual food receptacles 10 to be assembled therein, but if so desired, such receptacles may be removed from the pan and the pan utilized for baking or roasting meats and the like products. Each of the individual sector-shaped receptacles 10 is identical in construction and comprises a deep body portion 11 formed with a curved outer wall 12, a bottom wall 13, and a pair of side walls 14 converging from the opposite corners of the outer wall 12 and connected with one another through the medium of a concaved inner wall 15. Each of the sector-shaped food receptacles is provided with a closure 16 and a handle 17. The handles 17, of the sector-shaped food receptacles, are in convenient reach of the user of such utensil, to readily permit of one or all of the receptacles being removed or placed within the pan 5 in a simple and expeditious manner. The curvature of the outer wall 12 of the sector-shaped receptacles 10, conforms to the annular contour of the wall 7 of the pan adapting the receptacles to snugly engage with the inner contour of the annular wall 7 when the receptacles are reposed upon the bottom 6 of said pan, whereas the oppositely inclined side walls of such receptacles allow of the receptacles snugly engaging with one another, and the concaved inner wall forms between the confronting front faces of the individual food receptacles, a circular compartment 18. The circular compartment 18 is utilized for a cylindrical vessel 19 to be inserted therein and intended for coffee, tea or the like. Due to the manner of forming the individual food receptacles, I am able to cook different products within the individual food receptacles 10 and at the same time cook or heat coffee or tea placed within the cylindrical receptacle 19, by placing the pan 15 over a single burner (not shown). The cylindrical receptacle 19 is provided with a hinged closure 20.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative and that such changes may be made when desired as are within the scope of the appended claim.

Having thus described the invention, I claim:

In a device of the class described, a pan including an annular side wall, an imperforate bottom, and an annular flanged member extending downwardly below the bottom, and in alinement with the side wall, then deflected inwardly in a direction substantially parallel with the bottom and having its edge portion deflected upward and outward toward the outer portion of the pan forming a pocket for heated air, and a plurality of independent receptacles carried by the pan for containing different articles of food.

In testimony whereof I affix my signature.

DAVID NEWMAN PASCHAL.